United States Patent Office 2,818,392
Patented Dec. 31, 1957

2,818,392

PROCESS FOR PRODUCING AN ALKYLATION CATALYST

Herbert R. Appell, Riverside, Ill., assignor to Universal Oil Products Company, Des Plaines, Ill., a corporation of Delaware No Drawing. Application October 26, 1954
Serial No. 464,908

3 Claims. (Cl. 252—435)

This invention relates to the treatment of hydrocarbons in the presence of a particular type of catalyst to produce branched chain paraffins. The invention more particularly refers to an alkylation process conducted in the presence of a catalyst comprising a solid absorbent impregnated with a phosphoric acid and boron trifluoride.

This invention has as an object a new and improved method for producing branched chain paraffins.

Another object of the present invention is to react an alkylatable compound and an olefin-acting compound in the presence of a novel catalyst.

In one embodiment the present invention relates to a process for producing organic compounds, particularly hydrocarbons, of branched chain structure which comprises reacting convertible organic compounds in the presence of a catalyst comprising a solid absorbent impregnated with a phosphoric acid and boron trifluoride.

In a further embodiment the present invention relates to a process which comprises reacting an alkylatable compound and an olefin-acting compound at alkylating conditions in the presence of a catalyst comprising a solid carbonaceous absorbent impregnated with a phosphoric acid and boron trifluoride.

In a specific embodiment the present invention relates to a method of producing a catalyst which comprises impregnating a solid carbonaceous absorbent with a phosphoric acid, heating the composite and subsequently contacting the composite with boron trifluoride.

Alkylatable compounds which may be used as starting materials in this process comprise hydrocarbons, hydroxy hydrocarbons, and the like. The hydrocarbons include both branched chain alkanes and cyclic hydrocarbons, the preferred cyclic hydrocarbons being those of the aromatic series. The aromatic hydrocarbons including benzene hydrocarbons such as benzene, toluene, the xylenes, ethylbenzene and other alkylbenzenes containing at least one replaceable nuclear hydrogen atom. Polycyclic aromatic hydrocarbons such as naphthalene, alkyl naphthalenes and other poly-nuclear hydrocarbons which contain at least one replaceable nuclear hydrogen atom are also alkylated by olefin-acting compounds as herein set forth. The hydroxy hydrocarbons include particularly the phenols, naphthols and other hydroxy aromatic hydrocarbons, including mono-hydroxy and polyhydroxy aromatic hydrocarbons, an example of the latter being hydroquinone. The aromatic hydrocarbons including the benzene hydrocarbons may be obtained from any source such as by the distillation of coal, by the dehydrogenation of naphthalenic hydrocarbons, by the cyclization of aliphatic hydrocarbons and by other means. The cyclic hydrocarbons also include alkylatable cycloparaffins such as alkylcyclopentane and alkylcylohexane hydrocarbons. Branched chain paraffins such as isobutane, isopentane and other branched chain alkanes may also be charged to the alkylation treatment as herein set forth.

Suitable alkylating agents which may be charged in this process are olefin-acting compounds including monoolefins, diolefins, polyolefins, also alcohols, ethers, esters, the latter including alkyl halides, alkyl phosphates, certain alkyl sulfates and also esters of various organic carboxylic acids. The preferred alkylating agents are olefinic hydrocarbons which comprise monoolefins having one double bond per molecule and polyolefins which have more than one double bond per molecule. Monoolefins which may be utilized for alkylating aromatic hydrocarbons and other alkylatable compounds in the presence of the catalyst of this invention, as herein set forth, are either normally gaseous or normally liquid and include ethylene, propylene, butylenes, pentenes and higher normally liquid olefins, the latter including various polymers of gaseous olefins, particularly polymers having from 6 to 18 carbon atoms per molecule. Cycloolefins such as cyclopentene, cyclohexene, and various alkylcycloolefins may also be used. Other unsaturated hydrocarbons used as alkylating agents in this process include conjugated diolefins such as butadiene and isoprene, nonconjugated diolefins, other polyolefin hydrocarbons containing more than two double bonds per molecule, terpenic hydrocarbons, etc.

The catalyst employed in this process is preferably prepared by forming a composite by commingling a solid absorbent with a phosphoric acid, heating said composite to a temperature in excess of 100° C. and subsequently contacting the composite with boron trifluoride.

The main feature of the present invention, therefore, resides in the employment of ordinarily liquid phosphoric acids and ordinarily gaseous boron trifluoride as catalysts for alkylation reactions in substantially solid form. Phosphoric acid and boron trifluoride appear to enter into a complex and it may be the complex which is the actual catalyst instead of the individual components acting in an association of some sort. The complex that is present depends upon the ratio of phosphoric acid to boron trifluoride and chiefly depends upon the temperature to which the complex is heated. The complex may be present in various forms and represented by one or more of the following formulas: $2HPO_3 \cdot BF_3$, $H_4P_2O_7 \cdot 2BF_3$, $3HPO_3 \cdot BF_3$. A phosphoric acid and/or boron trifluoride may exist in the catalyst in their own forms, that is not as complexes and the phosphoric acid or boron trifluoride may be present in an excess of that required to form one or more of the complexes. The solid form is accomplished by the use of absorbent carrying materials which vary somewhat in their absorptive capacity and also in their chemical and physical properties and their influence upon the catalytic effect of the mixtures. The materials which may be employed are divisible roughly into several classes. One class comprises materials of a predominately siliceous character and includes diatomaceous earth, kieselguhr and artificially prepared porous silica such as, for example, Sil-O-Cel. In the case of naturally occurring diatoms it is believed that they sometimes contain minor amounts of highly active aluminum oxide which in some instances seems to contribute to the total catalytic effect of the solid catalyst. This active material is not present in the artificially prepared forms of silica.

Another class of materials which may be employed either alone or in conjunction with the first class comprises generally certain members of the class of aluminum silicates and includes such naturally occurring substances as the various fuller's earths and clays such as bentonite, montmorillonite, etc. The class also includes certain artifically prepared aluminum silicates of which the product known as Tonsil is representative, this substance being in a sense a purified aluminum silicate made by treating certain selected clays with sulphuric, hydrochloric or other mineral acid and washing out the reaction products. The naturally occurring substances in this general class are characterized by a high adsorptive capacity which is particularly in evidence in making up the present type of phosphoric acid-boron trifluoride catalyst, and they may also contain traces of active ingredients which may assist in producing desired effects. Again each silicate material which may be used alternatively will exert its own specific influence upon the net effectiveness of the catalyst composite which will not necessarily be identical with that of the other members of the class.

The preferred class of absorptive materials comprise forms of porous carbonaceous material or porous forms of carbon. Materials in this class are preferred since they appear to possess particular ability to hold the catalyst so that the acid of phosphorus and boron trifluoride have high activity. The porous forms of carbon evidently prevent the breakdown of the particular phosphoric acid-boron trifluoride complex which appears to be the active catalyst. Specifically preferred materials are charcoal, coke, etc. These charcoals or coke may be used in the regular form or they may be activated forms.

One of the essential ingredients of the solid catalysts which are employed in organic reactions according to the present invention is a phosphoric acid, which may constitute 80% or more of the catalyst mixture, and in most cases is over 30% by weight thereof. Of the various acids of phosphorus, the orthophosphoric acid ($H_3PO_4$) finds general application on account of its alkylating ability, its cheapness and the readiness with which it may be procured although the invention is not restricted to its use but may employ any of the other phosphoric acids insofar as they are adaptable. It is not intended to infer, however, that the different acids of phosphorus which may be employed will produce identical effects upon any given organic reaction, as each acid will exert its own characteristic action.

In using orthophosphoric acid, different concentrations may be employed from approximately 75 to 100% or acid containing some pyro and meta phosphoric acid may even be used. Within these concentration ranges, the acids will be thick liquids of varying viscosity and readily incorporated with the absorbent materials. In practice it has been found that pyrophosphoric acid corresponding to the formula $H_4P_2O_7$ is readily incorporated with siliceous and relatively inert carriers at temperatures somewhat above its melting point (61° C.) and that the period of heating which is given to the acid-absorbent mixtures may be changed from that employed with the ortho acid.

The type of phosphoric acid resulting on the catalyst, however, depends upon the temperature to which the composite is heated after impregnation. For example, starting with an aqueous solution of phosphoric acid and impregnating a porous carbon support with said solution, when drying the composite at low temperatures anhydrous orthophosphoric acid is formed, that is at temperatures in the lower part of the range 100° C. to 500° C. At moderate temperatures pyrophosphoric acid is formed, and at temperatures above 300° C. metaphosphoric acid is formed.

Boron trifluoride is another of the essential ingredients of the catalyst. Boron trifluoride is a gas at normal temperatures and boils at 101° C. at atmospheric pressure.

The catalysts of the present invention may be prepared by forming a solution of boron trifluoride in a liquid phosphoric acid and impregnating the porous absorbent with the resulting solution. Another method that may be used to prepare the catalyst is to first impregnate the porous absorbent with boron trifluoride followed by impregnation with a liquid phosphoric acid. The catalysts before use, however, are heated to an elevated temperature to remove excess water and when this is done after the boron trifluoride is added, some of the boron trifluoride is lost from the composite.

A preferred method of preparing the catalyst, therefore, is to first prepare a composite of porous support and a phosphoric acid, heat the composite to remove the excess water, and subsequently contact the resulting composite with boron trifluoride.

Composites of porous support and a phosphoric acid are producible by a series of relatively simple steps comprising generally: mixing a liquid phosphoric acid and absorbent material in selected proportions, heating at temperatures of approximately 180 to 220° C., and grinding and sizing the resultant product to produce particles of the desired size. The catalyst may be used in particle sizes of from approximately 4 to 20 mesh or may be made up into small briquettes. The optimum temperature of heating when employing these materials varies considerably. Good results have been obtained at temperatures as high as 600° C., through in some instances it would appear that too high temperatures above this point have a deleterious effect. The exact maximum temperature employed in the calcining step will be to some extent a matter of trial.

By the term "calcined mixture" is meant a mixture comprising a phosphoric acid and a solid adsorbent which has been heated to a temperature adequate to render it solid. This is accomplished at least in part by expelling water. The temperature usually will be within the range of from about 100° C. to about 600° C.

When pyrophosphoric acid is employed in the original mixes the temperatures employed in the mixing step are commonly those comprised within the range of from 120 to 180° C. Within this temperature range the acid is sufficiently fluid to enable rapid mixing by mechanical devices. Such mixes may then be calcined at temperatures from approximately 150 to 300° C., without deleterious effect upon the structure, strength or catalytic efficiency of the particles finally produced. When starting with this acid and heating at the somewhat higher permissible temperatures the heating or calcining period may be reduced in some instances from 48 to 60 hours down to about 20 hours.

As hereinbefore mentioned, the composite of a phosphoric acid and porous support is heated to a temperature of above about 100° C. and preferably is heated to a temperature within the range of from about 100° C. to about 500° C. As pointed out previously heating to various temperatures produces different phosphoric acids. The heating is preferably performed in an inert atmosphere, that is in the presence of an inert gas such as nitrogen, methane, hydrogen, etc. One of the chief purposes of heating the composite is to remove water from the composite and, therefore, the water that is driven off of the composite should be allowed to escape, that is, a pressure should not be maintained on the system, which pressure would be sufficient to keep a substantial amount of water in the liquid phase.

Catalysts of the present character are hygroscopic to a variable extent and are best ground, sized and preserved for use out of contact with moist air.

Owing to the possibility of varying both the active ingredients and the relatively inert absorbent materials which go to form the catalyst masses, a number of alternatives exist, each of which will have its own peculiar catalyzing character which will not be exactly equivalent to masses of different composition.

The dried composite is then impregnated with boron trifluoride to form the final catalyst. This may be done by passing a stream of boron fluoride into contact with the composite. Another method of adding boron trifluoride to the dried composite is to place the dried composite in a chamber and introduce boron trifluoride gas to the chamber so as to contact the composite therein. Superatmospheric pressure is preferably used in this step.

The process of this invention may be carried out in batch operation by placing an alkylatable compound and the catalyst in an autoclave and stirring while an olefin hydrocarbon is added gradually thereto, the reaction mixture being maintained at an elevated temperature at which alkylation of the hydrocarbon takes place. After the reaction has occurred, the reactor is then cooled and the alkylation product is recovered from the resultant reaction mixture.

It is preferred, however, to carry out this process in a continuous manner. This may be accomplished by placing a fixed bed of catalyst within a reactor such as a steel tube and the reactants, that is, the alkylatable compound and the olefin-acting compound are then passed continuously through the bed of catalyst at alkylation conditions. The alkylation product is then recovered from the reactor effluent and any unreacted alkylatable compound and olefin-acting compound may then be recycled to the reaction zone. Fluidized type of operation may also be employed in the presence of the aforementioned catalyst. In this method of operation, a charging stock is passed upwardly through a bed of finely divided catalyst causing the catalyst particles to become set in motion and form a fluid-like mass. Inasmuch as the alkylation reaction is exothermic, a portion of the catalyst may be withdrawn from the reaction zone either intermittently or continuously, the withdrawn catalyst is cooled and then returned to the reaction zone in order to provide a convenient method of temperature control. Another mode of operation which may be employed is the moving bed type of operation wherein a compact bed of the catalyst is passed continuously through the reaction zone either concurrently or countercurrently to the incoming reactants, the catalyst is then passed into a cooling zone from which it is returned to the reaction zone. Another alternative type of operation comprises suspending finely divided solid catalyst in a stream of charging stock and treating said suspension under suitable conditions of temperature and pressure to produce the desired alkylation reaction.

The temperature at which the alkylation process of this invention may be conducted is dependent upon the charging stocks being employed. However, the alkylation process is generally carried out at a temperature of from about 10° C. to about 300° C. and preferably at a temperature of from about 30° C. to about 200° C. Pressure aids the reaction of alkylation and consequently this process is preferably effected at a superatmospheric pressure which is generally not in excess of about 200 atmospheres.

In carrying out the alkylation of aromatic compounds, and particularly of aromatic hydrocarbons, an olefin-acting compound, an olefin-containing hydrocarbon fraction, or other olefin-acting compound may be commingled with a reacting aromatic compound so that the ratio of alkylatable compound to olefin-acting compound in a total mixture charged to the alkylation zone is approximately 5:1 on a molar basis. In some cases this molar ratio of alkylatable compound to olefin may be as low as about 1:1 or as high as 10:1 or even 50:1, the exact ratio being dependent somewhat on the particularly alkylatable compound and olefinic hydrocarbon or other olefin-acting material charged to the process.

In processing the charge stock over the catalyst boron trifluoride may be lost from the catalyst and the loss of boron trifluoride may be compensated for by adding boron trifluoride to the charging stock and/or to the reaction zone independently but simultaneously with said charging stock.

Alkylated compounds formed in this process may be used as intermediates for organic synthesis or utilized for other purposes. Thus alkylated aromatic hydrocarbons which are formed from benzene and olefins or from other aromatic hydrocarbons and olefins are useful as starting materials in the production of detergents, insecticides, synthetic rubber, etc. Also certain alkylated hydrocarbons are valuable as motor fuel constituents because of their relatively high octane numbers.

The following examples are given to illustrate this invention but they are introduced with no intention of limiting unduly the generally broad scope of the invention.

EXAMPLE I

A catalyst was prepared as follows: Fifty grams of activated wood charcoal was impregnated with 85% phosphoric acid and then heated in a stream of nitrogen for one hour at 600° C. This material was then placed in a bomb and boron trifluoride added to a pressure of 35 atmospheres and the bomb maintained at 75° C. for five hours. The catalyst contained 50% of $3HPO_3 \cdot BF_3$. This catalyst is designated catalyst A.

EXAMPLE II

A catalyst was prepared as follows: Fifty grams of activated charcoal was impregnated with 85% phosphoric acid and then dried in a stream of nitrogen at 250° C. for two hours. The catalyst was placed in a bomb with 33 atmospheres of boron trifluoride and heated to 50° C. These conditions were maintained for four hours. This catalyst, designated catalyst B, was analyzed as 56% $H_4P_2O_7 \cdot 2BF_3$.

EXAMPLE III

A catalyst was prepared as follows: Fifty grams of activated wood charcoal was impregnated with 95% phosphoric acid and then dried for two hours in a stream of nitrogen at 400° C. The catalyst was then placed in a bomb with 30 atmospheres of boron trifluoride and heated to 75° C. The bomb was maintained at these conditions for five hours. This catalyst, designated catalyst C, was analyzed as 59% $2HPO_3 \cdot BF_3$.

EXAMPLE IV 45.5 grams of activated wood charcoal was impregnated with phosphoric acid-boron trifluoride complex $$(H_3PO_4 \cdot BF_3)$$

The catalyst was then dried at 110° C. in air and at 170° C. in a stream of nitrogen for one hour. This catalyst, designated catalyst D, was analyzed as 30% of the complex.

EXAMPLE V

Each of the above prepared catalyst was used to catalyze an alkylation reaction. The charge stock comprised the following mixture.

0.5% $C_2H_8$
0.2% $C_2H_6$
16.9% $C_3H_6$
0.8% $C_3H_8$
80.5% i-$C_4H_{10}$
1.1% n-$C_4H_{10}$

The charge stock was pumped into the reactor at various hourly liquid space velocities, H. L. S. V. (defined as the volume of charge per hour per volume of catalyst in the reaction zone). These rates are shown in the table below. The operating conditions and results are shown in the following table.

*Table*

| Catalyst | A | B | C | D |
| --- | --- | --- | --- | --- |
| Temperature, °C | 50 | 50 | 25 | 40–125 |
| Pressure, p. s. i. | 1,000 | 1,000 | 1,000 | 1,000 |
| H. L. S. V. | 1.51 | 1.40 | 1.52 | 1.42 |
| Wt. Charge | 354.4 | 306.4 | 324.6 | 418.1 |
| Wt. Liquid Product | 57.3 | 55.3 | 51.6 | 68.1 |
| Liquid Product, Percent Yield Based On Olefins Charged | 125.5 | 118.2 | 104.2 | 46.6 |

The above examples illustrate that the catalysts as set forth in the specification and examples are effective alkylation catalysts. Referring to the results using catalyst D, it may be seen that this catalyst was not as effective as the others. This illustrates that it is preferred to add the boron trifluoride to the catalyst after the phosphoric acid has been composited with the porous support and dried.

I claim as my invention:

1. A method of producing a catalyst which comprises impregnating a solid support selected from the group consisting of siliceous and carbonaceous absorbents with an aqueous solution of a phosphoric acid, drying the composite at a temperature of from about 100° C. to about 600° C., and subsequently impregnating the resultant solid material with boron trifluoride.

2. The method of claim 1 further characterized in that said absorbent is a porous carbon.

3. The method of claim 1 further characterized in that said absorbent is activated charcoal.

References Cited in the file of this patent

UNITED STATES PATENTS

| | | |
|---|---|---|
| 2,380,234 | Hall | July 10, 1945 |
| 2,412,595 | Axe | Dec. 17, 1946 |
| 2,471,922 | Axe | May 31, 1949 |
| 2,575,457 | Mavity | Nov. 20, 1951 |